United States Patent [19]
Crooks

[11] 3,763,978
[45] Oct. 9, 1973

[54] TWO SPEED TRANSMISSION WITH BRAKE
[76] Inventor: James W. Crooks, 4973 N. Larkin St., Whitefish Bay, Wis. 53217
[22] Filed: Oct. 14, 1971
[21] Appl. No.: 189,380

[52] U.S. Cl..................... 192/4 A, 74/751, 192/54, 192/70.28, 188/71.2
[51] Int. Cl.......................................... F16h 57/10
[58] Field of Search............................ 192/4 A, 4 R

[56] References Cited
UNITED STATES PATENTS
2,245,017  6/1941  Sinclair............................. 192/4 A
2,334,734  11/1943  Taylor................................ 192/4 R Primary Examiner—Benjamin W. Wyche
Attorney—Harold B. Hood et al.

[57] ABSTRACT

The invention is a two speed transmission including first and second shafts independently rotatably journaled in a housing and coupled together with an epicyclic gear assembly. The epicyclic gear assembly includes a ring gear and a sun gear one of which is coupled to a predetermined one of the first and second shafts and at least one pinion gear coupled to the other of the shafts for rotation therewith. Brake means are coupled to the other of the ring and sun gears for selectively locking and unlocking same against rotation, and self-actuating clutch means are provided for coupling the aforementioned other gear to the pinion gear. The clutch means includes spring means for forcibly engaging the clutch when the aforementioned other gear is unlocked and a helical spline means for forcibly frictionally disengaging the clutch means in response to locking the aforementioned other gear.

25 Claims, 3 Drawing Figures

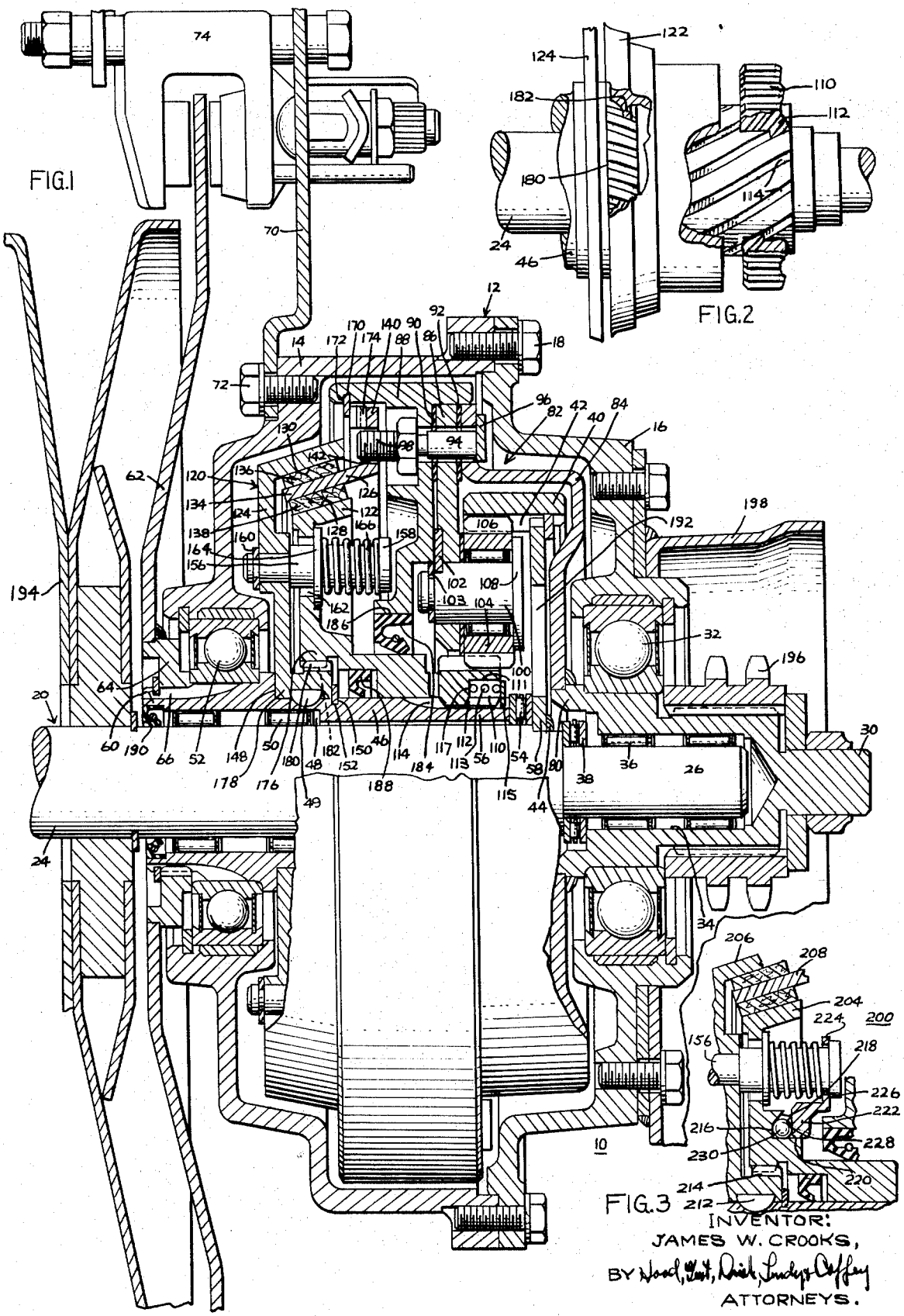

TWO SPEED TRANSMISSION WITH BRAKE

BACKGROUND OF THE INVENTION

1. Field of the Invention

The invention relates to a geared transmission utilizing an epicyclic gear assembly and in particular, is a two speed transmission having a mechanical clutch and incorporating compression springs and helical splines to effect engagement and disengagement thereof.

2. Description of the Prior Art

Multiple ratio geared transmissions utilizing epicyclic or planetary gear assemblies are well known. Typically, such transmissions utilize a brake mechanism and a clutch mechanism coupled to and between a predetermined ones of the gears of the epicyclic gear assembly, respectively, the brake and clutch mechanisms being alternately engaged and disengaged by means of hydraulic or mechanical devices to change the drive ratio of the transmission.

In one such prior art transmission, the epicyclic gear assembly incorporates helical gears and the axial thrust on the gears is utilized to engage or disengage the clutch mechanism. Correspondingly, a separate mechanism is required to operate the clutch into its opposite mode, this latter mechanism typically including a hydraulic device, one way clutch, or an independent mechanical linkage.

SUMMARY OF THE INVENTION

The present invention is a two speed, geared coupling or transmission operable between a first condition in which it provides a differential gear ratio between first and second shafts, these normally being the input and output shafts, and a second condition in which it provides a unity ratio therebetween. The coupling is provided with a first and second shaft independently rotatably journaled in a housing and coupled together with an epicyclic gear assembly which includes a ring rear, a sun gear, and at least one pinion or planetary gear. One of the ring and sun gears is fixedly secured to the first shaft and the pinion gear is coupled to the other shaft. Coupled to the other of the ring and sun gears is a brake means for selectively locking and unlocking same from rotation. Coupled between the last mentioned gear and another of the gears of the epicyclic gear assembly is a clutch means for selectively locking the aforementioned other gear to the pinion gear when the brake means is in an unlocked condition. The clutch means is self-actuating and includes a helical spline means responsive to locking the brake means, and spring means responsive to unlocking the brake means for forcibly disengaging and engaging the clutch means, respectively.

It is therefore an object of the invention to provide an improved two speed transmission which provides a differential and a unity ratio coupling;

It is another object of the invention to provide such a transmission having a manually operable brake and a clutch whereby only the brake means must be actuated to selectively operate the transmission between differential and unity ratios;

It is yet another object of the invention to provide such a transmission in which a helical spline is utilized to deactuate the clutch means;

It is still another object of the invention to provide such a transmission in which the torque transmitting capability of the clutch means in the braking mode of transmission operation increases in proportion to the braking load on the transmission;

It is still another object of the invention to provide such a transmission in which the clutch is entirely mechanically actuated;

It is another object of the invention to provide a transmission that provides a positive coupling between the input and output shaft for both positive and negative loads therebetween.

BRIEF DESCRIPTION OF THE DRAWINGS

The above-mentioned and other features and objects of this invention and the manner of obtaining them will become more apparent and the invention itself will be best understood by reference to the following description of an embodiment of the invention taken in conjunction with the accompanying drawings, wherein:

FIG. 1 is an axial-sectional view of a two speed transmission in accordance with the invention.

FIG. 2 is a fragmentary partial cut away view showing details of the spline means.

FIG. 3 is a fragmentary partial cut away view showing details of a modification of the invention.

DESCRIPTION OF A SPECIFIC EMBODIMENT

Referring now to the drawings there is illustrated a two speed geared transmission or coupling 10 comprising a housing 12 having front and rear sections 14 and 16, respectively, which are secured together with a plurality of threaded fasteners as at 18. A first shaft 20 is rotatably carried in housing 12 and includes a major portion 24 and a reduced diameter pilot portion 26. A second shaft 30 is also rotatably journaled in housing 12 by means of a sealed ball bearing assembly 32 and is provided with a cylindrical bore 34 which receives first shaft pilot portion 26 and is rotatably supported thereon with a plurality of needle bearings as at 36. Axial thrust between first shaft 20 and second shaft 30 is counteracted by a thrust bearing 38 therebetween. An internal ring gear 40 having spur teeth 42 is drivingly coupled to first shaft 20 by welding as at 44.

A hollow cylindrical brake shaft 46 has a stepped diameter bore 48 and is rotatably carried on first shaft 20 by means of a plurality of needle bearings 50. First shaft 20 and brake shaft 46 are further rotatably carried in housing 12 by means of a second sealed ball bearing assembly 52 and axial thrust on the brake shaft 46 is carried by sealed ball bearing 52 and a needle thrust bearing assembly 54, the latter being disposed between end 56 of brake shaft 46 and annular flange 58 of ring gear 40.

Brake shaft 46 has an end 60 distal to end 56 which extends outwardly of housing 12. A dish shaped brake disk 62 is provided with an annular, splined hub 64 whereby it is drivingly secured to end 60 of brake shaft 46 by means of complementary splines 66 thereon.

Fixedly secured to housing 12 by means of a bracket 70 and threaded fastener 72 is a conventional caliper brake assembly 74, caliper brake assembly 74 being of the type which is selectively manually operable between a first position in which it is disengaged from brake disk 62 and a second position in which it clampingly engages brake disk 62. It can now be observed that when brake caliper 74 is disengaged from brake disk 62, the latter is freely rotatable within housing 12 and, conversely, when caliper brake 74 is engaged with brake disk 62, brake shaft 46 is locked against rotation.

Fixedly secured to inner end 80 of second shaft 30 is a pinion gear carrier 82 which comprises a drum member 84 fixedly secured to end 80 of output shaft 30 as by welding, an annular pinion gear mounting flange 86 and a clutch member mounting hub 88. The drum 84, pinion flange 86, and clutch hub 88 are fixedly secured together with annular gaskets 90 and 92 therebetween by means of suitable threaded fasteners 94. Fasteners 94 have enlarged heads 96 and distally disposed, threaded portions 98 which extend outwardly from clutch hub 88 in a direction parallel to the axis of brake shaft 46 for a reason to be explained below.

A plurality of pinion gear shafts 100 are mounted on pinion flange 86 in an annular array and fixedly secured thereto by means of a suitable keeper 102 and snap ring 103. Rotatably carried on each pinion gear shaft 100 is a pinion or planet gear 104 having spur gear teeth 106 which are operatively meshed with the teeth 42 of ring gear 40 in conventional manner, pinion gears 100 being held against axial movement by the enlarged heads 108 of pinion shafts 100.

Coaxially received on brake shaft 46 is a sun gear 110 which is secured thereto for rotation therewith by means of an internal male spline 112 on sun gear 110 and a complementary, external female spline 114 on brake shaft 46. As best seen in FIG. 2, splines 112, 114 are formed in a left-handed helix, that is in a direction of a left-handed screw thread, and female spline 114 on brake shaft 46 is longer than male spline 112 on sun gear 110 whereby sun gear 110 is able to move axially with respect to brake shaft 46 to a limited extent.

A clutch assembly 120 includes a pressure member 122, a backup member 124, and a driven member 126. Pressure member 122 and backup member 124 are provided with concentric, frusto-conical friction surfaces 128, 130, respectively, and clutch driven member 126 includes s a frusto-conical portion 134 disposed coaxially therebetween. Secured to frutso-conical portion 134 are a plurality of friction-increasing linings 136, 138. Driven member 126 further includes an annular flange portion 140 which has therethrough a plurality of holes 142 in an annular array which are slidably received on ends 98 of threaded fasteners 94 whereby clutch driven member 126 is drivingly coupled to pinion carrier 88 for rotation therewith and is axially movable with respect thereto.

Clutch backup member 124 is received on and keyed to brake shaft 46 with a suitable key element 49 and secured against axial movement thereon by shoulder 148 of brake shaft 46 and a suitable snap ring 150 which is resiliently engaged within an annular groove 152 in brake shaft 46.

A plurality of mounting pins 156 having enlarged heads 158 are fixedly secured to clutch backup member 124 in an annular array by means of suitable retaining clips 160. Pins 156 extend through suitable holes 162 which are provided in clutch pressure member 122 in registry with pins 156. Holes 162 are of larger diameter than pins 156 to allow for limited, rotational movement between clutch pressure member 122 and clutch backup member 126 for a reason to be explained below. Received on pins 156 are flat washers 164 and a helical compression spring 166 is compressibly fitted between enlarged heads 158 of pins 156 and washers 164. It will now be apparent that springs 166 will resiliently urge clutch pressure member 122 to the left as viewed in FIG. 1. Correspondingly, because clutch driven member 126 is axially movable by reason of its sliding fit on ends 98 of threaded fasteners 94, springs 166 will urge clutch members 122, 126, and 124 into frictional engagement with each other.

A suitable snap ring 170 is secured within an annular groove 172 in clutch mounting hub 88 and an annular wave spring 174 is compressibly received between snap ring 170 and mounting hub 88. It will now be apparent that when clutch pressure member 122 is forcibly moved to the right (as viewed in FIG. 1), wave spring 174 will forcibly move clutch driven member 126 to the right (as viewed in FIG. 1) and out of frictional engagement with clutch backup member 124. Wave spring 174 is selected such that it exerts a disengaging force less than the engaging force exerted by springs 166 and such that it will move clutch driven member 126 in an amount just sufficient to prevent frictional contact between friction lining 136 affixed thereto and clutch backup member 124.

Clutch pressure member 122 and clutch backup member 124 are provided with concentrically disposed hub portions 176, 178, respectively, which are drivingly coupled together by means of mating splines 180, 182. As best seen in FIG. 2, splines 180, 182 are again formed in a helix. However, splines 180, 181 are right-handed, i.e., in the direction of a right-handed screw thread, and extend at a helix angle which is preferably less than the helix angle of the splines 112, 114. It should be noted that spline 180, which is on hub portion 178, is axially longer than the spline 182 and sufficient clearances are provided between the respective hub portions 176, 178 whereby clutch pressure member 122 can move axially with respect to backup member 124.

The sun gear 110 is a part separate from hub portion 176, and is provided with an internal bore 111 which receives coaxially a helical compression spring 113. This spring 113 yieldably urges the sun gear 110 leftward on shaft 46 by bearing against a snap ring 115 on shaft 46 and shoulder 117 in the bottom of bore 111.

A resilient seal 184 is frictionally secured within a suitable bore 186 in clutch mounting hub 88 and slidably engages the outside periphery of clutch pressure member 122. Similar seals 188, 190 form fluid tight, sliding seals between clutch pressure member 122 and brake shaft 46, and between brake shaft 46 and first shaft 20, respectively. It can now be seen that brake shaft 46, second shaft 30, pinion carrier members 84, 86, and 88, and clutch pressure member 122 define a fluid tight chamber 192 which encloses ring gear 40, pinion gears 104, sun gear 110, and needle bearings 36, and 50. This chamber is partially filled with a suitable liquid lubricant to lubricate the aforementioned gears and bearings, and, because chamber 192 is sealed, lubricant is prevented from passing therefrom to contaminate clutch friction linings 136, 138.

A sheave 194 is fitted to first shaft 20 and a toothed drive element 196 is secured to second shaft 30 for rotation therewith, respectively, drive element 196 being partially enclosed within a suitable protective cover 198.

Generally, during operation of the coupling 10 in direct drive, clutch 120 is positively engaged thereby locking sun gear 110 against rotation relative to the pinion gears 104 via clutch mounting hub 88 and pinion flange 86. With sun gear 110 locked to pinion gears 104, sun gear 110 and pinion gears 104 are restrained from relative rotation and, correspondingly, pinion gears 104 are restrained from rotation with respect to ring gear 40 thereby effecting a direct coupling therebetween to second shaft 30.

Upon application of caliper brake 74, sun gear 110 is restrained from rotating, and, as will be explained in detail below, clutch 120 automatically disengages. In this mode, pinion gears 104 will rotate between ring gear 40 and sun gear 110 thereby coupling first shaft 20 to second shaft 30 through a reduced ratio gear coupling.

In explaining the operation of the coupling, it is assumed that the first shaft 20 is being driven in a clockwise direction as viewed from the left of the transmission (as viewed in FIG. 1) and that there is a load on the second shaft 30 which resists rotation thereof.

To operate the coupling in direct drive, i.e., unity gear ratio between the first and second shafts, 20, 24, respectively, caliper brake 74 is released thereby permitting brake disk 62 and brake shaft 46 to rotate freely within housing 12. Because ring gear 40 is fixedly secured to first shaft 20 it also rotates in a clockwise direction. Assuming that there is a load on the second shaft 30, a torque is applied to the pinion carrier 82 thereby tending to restrain it from rotation. Consequently, the clockwise rotation of ring gear 40 applies a torque to pinion gears 106 tending to make them rotate about pinion shafts 100. This in turn causes a counter clockwise torque to be applied to sun gear 110. Under these conditions, sun gear 110 would normally be urged to rotate in a counter clockwise direction resulting in rightward movement which compresses spring 113 on shaft 46. The compression springs 166 resiliently urge clutch pressure member 122, and clutch backup member 124 into frictional engagement with clutch driven member 126. The torque on shaft 46 is directly imparted to clutch backing 124 via the keyed connection 123. Similarly, a portion of the torque on clutch backing 124 is transmitted to clutch member 122 by reason of the right-hand splined connection 180, 182. Because of the helix angle of the splined connection 180, 182, the clutch member 122 tends to move toward the right in a direction to become disengaged. However, the force of the springs 166 overcome this force of disengagement, thereby maintaining clutch member 122 engaged with the other clutch parts 124 and 126. Thus is is seen that, under these conditions, the clutch 122, 124, 126 (120) is engaged. This positive engagement of the clutch 120 positively locks sun gear 110 against rotation with respect to pinion gears 104 and thereby establishes a direct coupling or a unity gear ratio between the first shaft 20 and second shaft 30.

To operate the coupling in a reduced ratio mode, i.e., in a condition wherein the second shaft 30 will be coupled to the first shaft 20 to rotate at a reduced speed with respect thereto, caliper brake 74 is manually frictionally engaged with brake disk 62. With brake disk 62 thus restrained from rotation with respect to housing 12, brake shaft 46 is similarly restrained against rotation. As before, ring gear 40 is being driven in a clockwise direction and there is a load on second shaft 30 tending to restrain rotation of pinion carrier 82. Correspondingly, ring gear 40 tends to rotate pinion gears 104 about pinion shafts 100 thereby transmitting a counter clockwise torque to sun gear 110 which tends to rotate sun gear 110 in a counter clockwise direction.

Since sun gear 110 is coupled to brake shaft 46 by spline 114 which is formed in the shape of a left-handed helix, this torque produces an axial thrust on sun gear 110 which acts to force sun gear 110 to the right (as viewed in FIG. 1). Correspondingly, movement of sun gear 110 to the right (as viewed in FIG. 1) will permit clutch member 122 to move to the right by reason of the unwinding action of the right-hand splined connection 180, 182 thereby causing disengagement of the clutch 120. Simultaneously, when clutch member 122 becomes disengaged from clutch member 126, wave spring 174 will urge clutch driven member 126 to the right (as viewed in FIG. 1) by reason of the axially slidable coupling of clutch driven member 126 to threaded fasteners 98. Thus, it can be seen that when sun gear 110 is forced to the right, clutch 120 is automatically disengaged. Since sun gear 110 is locked against rotation, ring gear 40 will cause pinion gears 104 to orbit sun gear 110. Correspondingly, second shaft 30 will be driven at a reduced ratio by reason of its direct coupling to pinion carrier 82.

Another important feature of the coupling and one which is of particular value when the coupling is used as a transmission in a motor vehicle such as, for example, a snowmobile, is that it also provides a positive coupling between the first shaft 20 and second shaft 30 when momentum of the vehicle tends to drive the second shaft 30 faster than the first shaft 20. This positive coupling thus enables braking of the vehicle by reason of engine drag and simultaneously, applies the braking force applied by caliper brake 74 on brake disk 62 to second shaft 30. Thus the caliper brake 74 can also be used as a brake for the vehicle in which the transmission 10 is mounted.

In this latter mode of operation, the conjoint action of the various parts produces firm engagement of the clutch 120 such that the brake disc 62 in effect is directly coupled to the shaft 30. Thus, application of the caliper brake 74 will result in the application of braking torque to the output shaft 30. This action is as follows:

Due to the momentum of the vehicle, the output shaft 30 becomes the driver, imparting torque to the remainder of the mechanism. This driving torque is applied to the pinion carrier member 84. Because of engine drag on shaft 20, part of the applied torque will split between the clutch 120 and the carrier flange 86. The portion of the torque applied to flange 86, thus to pinions 104, is transmitted to sun gear 110 in a clockwise direction (viewing FIG. 1 from the left) causing it to wind on the helical spline 112, 114 to the left into forceful abutting contact with the hub of clutch member 122. This abutting contact aids in maintaining engagement of the clutch 120 by urging clutch member 122 toward the left. Spring 113 also aids in maintaining clutch 120 in engagement by urging sun gear 110 toward the left.

The remaining portion of the torque on the carrier 84 splits to the clutch 120 via the hub 88, and clutch member 126, to the two clutch members 122 and 124. The torque is here split between these latter two members, with the larger portion passing to the member 124, the reason for this being the difference in the areas of the friction surfaces on the two members 122 and 124, respectively. The torque in larger member 124 passes directly to the brake shaft 46. The torque on the member 122 is in a direction which tends to unwind it via splines 180, 182 from engagement with members 124, 126.

However, the disengaging force is overcome by the sun gear action leftward as first explained. Also, the springs 166 aid in maintaining this clutch engagement.

Thus, application of braking force to the disk 62 by means of caliper 74 slows the vehicle.

A further mode of operation involves braking the vehicle against backward motion. In this event, counter clockwise torque appears on carrier 84. This torque splits between the clutch 120 and the pinion flange 86 as before, but sun gear 110 is now wound on splines 112, 114 rightward, compressing spring 113. This separates sun gear 110 from the hub of clutch member 124. Clutch member 124 does not follow this rightward movement thereby causing disengagement of the clutch 120, but instead, due to the right-hand helix of spline 180, 182, the member 122 winds leftward into engagement with members 126 and 124. This engagement results in a frictional turning movement being applied to member 122 causing it to further wind into tighter engagement thereby producing a self-energizing action of almost infinite capacity.

It will now be seen that the mechanism of this invention, in a unique manner, provides for all of the necessary functions in achieving the usual requirements of plural speed drive plus braking action both forward and reverse.

Referring now to FIG. 3 there is illustrated a two speed geared transmission 200 in accordance with the invention which incorporates a modified clutch assembly 202. As in the abovedescribed embodiment, clutch assembly 202 includes a clutch pressure member 204, clutch backing member 206, and driven member 208. Backing member 206 is carried on brake shaft 210 and keyed thereto for rotation therewith with a suitable key 212. Clutch driven member 208 is rotatably coupled to pinion gear carrier assembly (not shown) as described above in reference to FIG. 1, and clutch driven member 204 is coupled to clutch backup member 206 with a right-handed helical spline coupling at 214.

Pressure member 204 is further provided with an annular recess 216 which has a rearwardly and outwardly tapered surface 218 and a cylindrical shaft portion 220. Carried on shaft portion 220 is a suitable hub 222 which includes an external flange 224 having therethrough a plurality of holes 226 which are disposed in registry with and engagingly receive pins 156. Hub 222 further includes a radially extending surface 228 disposed adjacent recess 216.

Rotatably received in recess 216 in rolling engagement with surface 218 thereof and surface 228 of hub 222 are a plurality of steel balls 230. It will now be observed that, with clutch pressure member 204 and hub 228 rotating, steel balls 230 will rotate therewith and be urged radially outwardly by centrifugal force. As the balls 230 try to move outwardly, they generate a force on clutch pressure member 204 leftwardly (as viewed in FIG. 3) thereby forcing the members of clutch 202 into more positive engagement.

It is further observed that a transmission in accordance with the invention does not provide a neutral coupling. However, this presents no difficulty since in most, if not all, applications of the transmission, the first shaft 20 will be coupled to a prime mover such as an engine through a fluid or centrifugal type coupling and the coupling will enable the necessary relative slippage between the prime mover and the transmission when the prime mover is idling.

It should also be noted that a smooth transition or shift from one gear ratio to the other is easily effected by simply applying and releasing the caliper brake 74 gradually. This action smooths out the engagement and disengagement of the clutch thereby enabling smooth shifting characteristic.

While the above description has been based upon an embodiment of the invention in which the ring gear is fixedly secured to the first shaft and the sun gear drivingly coupled to the brake shaft, it will be apparent that the coupling could also be constructed with the sun gear fixedly secured to the first shaft and the ring gear drivingly coupled to the brake shaft with a helical spline.

In a working model of a two speed coupling in accordance with the invention, the helix angle of the splines 112, 114 is 33° and the helix angle of splines 180, 182 is 15°. In this embodiment there are 12 helical springs 166 which generate a total engaging pressure on clutch pressure member 122 of 48 pounds. Wave spring 174 generates a releasing force between clutch backup member 124 and clutch driven member 126 of four pounds. All gears are of the straight spur type, ring gear 40 having seventy-four teeth, planet gears 104 having twenty teeth, and sun gear 110 having thirty-four teeth producing a gear ratio of 1.0 to 1.0 in a direct drive and 1.4594 in reduced coupling mode. FIG. 1 of the drawings is substantially to scale.

While there have been described above the principles of this invention in connection with specific apparatus, it is to be clearly understood that this description is made only by way of example and not as a limitation to the scope of the invention.

What is claimed is:

1. In a two speed transmission, the combination comprising
   a. an epicyclic gear assembly including a ring gear, a sun gear and at least one pinion gear,
   b. a first rotatable shaft drivingly coupled to one of said ring and sun gears,
   c. a second rotatable shaft drivingly coupled to said pinion gear,
   d. brake means for selectively locking and unlocking the other of said ring and sun gears against rotation,
   e. clutch means coupled between said pinion gear and said other gear for selectively locking said pinion gear to said other gear thereby shifting between low gear to high gear, respectively, said clutch mans including
      1. a backup member drivingly coupled to said other gear, a pressure member drivingly coupled to said backup member, and a driven member drivingly coupled to said pinion gear,
      2. first helical spline means coupling said backup member to said pressure member for disengaging same from said driven member in response to actuation of said brake means and to a first torque between said pressure member and said driven member in a first rotational direction, thereby providing a shift into low gear,
      3. clutch-actuating means responsive to unlocking said braking means for forcibly engaging said pressure, driven and backup members for conjoint rotation, thereby providing a shift into high gear, and
      4. said clutch-actuating means also being responsive to actuation of said braking means and also torque in a predetermined direction on said other gear for forcibly engaging said clutch members as aforesaid, thereby providing a braking action.

2. The combination of claim 1 in which said first helical spline means is of such angle that upon actuation of said braking means and application of a second torque between said pressure and driven members in a direction opposite to said first rotational direction, said clutch members are self-energizingly engaged.

3. The combination of claim 2 wherein said clutch-actuating means includes first spring means operatively coupled between said pressure member and said backup member for resiliently urging said pressure and backup members into frictional engagement with said driven member.

4. The combination of claim 3 wherein said pressure and backup members include flat circular portions disposed coaxially of said first shaft in parallel, spaced apart relationship, one of said circular portions having therethrough a plurality of holes in an annular array, there being a plurality of coupling pins each extending through a predetermined one of said holes and having one end thereof fixedly secured to the other of said circular portions, the distal ends of said pins being provided with enlarged heads, said holes having a diameter greater than the diameter of said pins, and said spring means including a plurality of helical springs compressibly received on said pins between said heads and said one circular portion.

5. The combination of claim 3 wherein said driven member is axially movable with respect to said backup member, and further including second spring means for resiliently urging said driven member out of engagement with said backup member upon occurrence of said first torque.

6. The combination of claim 5 further including a pinion gear carrier, said pinion gear being rotatably journaled thereon, said second spring means including a wave spring compressibly disposed between said pinion gear carrier and said driven member.

7. The combination of claim 2 wherein said pressure member and said backup member have concentric, telescopically engaged hub portions, said first spline means including at least one helical male spline on one of said hub portions and disposed at a first predetermined helix angle, and a female spline complementary to said male spline on the other of said hub portions and operatively engaged therewith.

8. The combination of claim 2 wherein said pressure member and said other gear are relatively axially movable.

9. The combination of claim 8 wherein said clutch-actuating means further includes third spring means for resiliently urging said other gear into abutting engagement with said pressure member in a first axial direction to increase the frictional engagement of said pressure and driven members in response to said predetermined torque.

10. The combination of claim 9 further comprising second helical spline means coupling said other gear to said brake means for forcibly urging said other gear in a direction opposite said first axial direction in response to locking thereof against rotation and in the absence of said predetermined torque.

11. The combination of claim 10 wherein said first spline means includes a first pair of complementary male and female helical splines formed on said backup and pressure members and said second spline means includes a second pair of complementary male and female splines formed on said brake means and said other gear, respectively, said first pair of splines extending at a first helix angle in a first rotational direction, said second pair of splines extending at a second helix angle in a second rotational direction.

12. The combination of claim 11 wherein said first helix angle is greater than said second helix angle and said first rotational direction is opposite to said second rotational direction.

13. The combination of claim 12 wherein said first helix angle is 15°, and said second helix angle is 33°.

14. The combination of claim 13 wherein said one gear is said ring gear and said other gear is said sun gear.

15. The combination of claim 1 wherein said pressure and backup members have complementary coaxially disposed frusto-conical surfaces and said driven member includes a frusto-conical portion disposed therebetween, said first spline means moving said pressure member and said backup member axially away from each other to disengage said driven member.

16. The combination of claim 15 wherein said pressure member is axially movable with respect to said other gear.

17. The combination of claim 15 including friction increasing linings fixedly secured to said frusto-conical portion, said pressure member and said backup member engaging said linings when said clutch is engaged.

18. The combination of claim 17 wherein said driven member is axially relatively movable with respect to said pinion gear.

19. The combination of claim 1 wherein said brake means includes a third shaft and a brake disk fixedly secured thereto, said first, second, and third shafts being disposed along a common axis and journaled for independent rotatable movement.

20. The combination of claim 19 wherein said brake further includes a manually operable caliper brake for selectively, frictionally engaging and disengaging said brake disk.

21. The combination of claim 1 further comprising a first housing, said first and second shafts and said brake means being independently rotatably journaled therein, and a second housing enclosing said epicyclic gear assembly, said second housing being rotatable with respect to said first housing and including seal means for rendering said second housing fluid tight.

22. The combination of claim 21 wherein said epicyclic gear assembly further includes a pinion gear carrier, said pinion geare being rotatably journaled thereon, said carrier forming a part of said second housing.

23. The combination of claim 22 wherein said brake means includes a third shaft, said first, second, and third shafts being coaxially journaled within said first housing, said third shaft being rotatably journaled on a first portion of said first shaft, said second shaft being rotatably journaled on a second portion of said first shaft.

24. The combination of claim 1 wherein said clutch means further includes means responsive to conjoint rotation of said pressure and backup members for increasing the frictional engagement thereof with said driven member.

25. The combination of claim 24 wherein said engagement increasing includes including an annular recess in said pressure member, a hub drivingly coupled to said backup member and having a radially extending surface thereon disposed adjacent said recess, said annular recess having an angled surface thereof extending radially outwardly towards said radially extending surface, and a plurality of high density spherical balls recieved in said annular recess, said balls being simultaneously engaged with said angled and said radially extending surfaces when said pressure member and said hub are rotating.

* * * * *